(12) United States Patent
Wright (10) Patent No.: US 10,485,366 B2
(45) Date of Patent: Nov. 26, 2019

(54) CLIP

(71) Applicant: Phineas Products Ltd, Bristol (GB)

(72) Inventor: Dan Wright, Bristol (GB)

(73) Assignee: Phineas Products Ltd, Bristol (GB)

( * ) Notice: Subject to any disclaimer, the term of this patent is extended or adjusted under 35 U.S.C. 154(b) by 246 days.

(21) Appl. No.: 15/509,172

(22) PCT Filed: Sep. 8, 2015

(86) PCT No.: PCT/GB2015/052593
§ 371 (c)(1),
(2) Date: Mar. 6, 2017

(87) PCT Pub. No.: WO2016/038354
PCT Pub. Date: Mar. 17, 2016

(65) Prior Publication Data
US 2017/0265665 A1    Sep. 21, 2017

(30) Foreign Application Priority Data

Sep. 8, 2014  (GB) .................................. 1415835.6

(51) Int. Cl.
| A47G 25/48 | (2006.01) |
| A47G 25/00 | (2006.01) |
| F16B 45/00 | (2006.01) |
| F16B 2/00  | (2006.01) |

(Continued)

(52) U.S. Cl.
CPC .......... *A47G 25/483* (2013.01); *A47G 25/005* (2013.01); *F16B 2/005* (2013.01); *F16B 2/10* (2013.01); *F16B 45/00* (2013.01); *F16M 13/022* (2013.01)

(58) Field of Classification Search
CPC ......... Y10T 24/44385; Y10T 24/44479; Y10T 24/44393; Y10T 24/44376; A47G 25/483; A47G 25/005; F16M 13/022; F16G 2/005; F16G 2/10
See application file for complete search history.

(56) References Cited

U.S. PATENT DOCUMENTS 2,950,939 A * 8/1960 Van Volkenburgh .... B65G 7/12
                                                              24/507
4,807,334 A    2/1989 Blanchard

FOREIGN PATENT DOCUMENTS

| DE | 9210451 U1  | 10/1992 |
| DE | 20111315 U1 | 10/2001 |
| GB | 2167659 A   | 6/1986  |

(Continued)

OTHER PUBLICATIONS

International Search Report and Written Opinion for International Application No. PCT/GB2015/052593, entitled "A Clip", dated Nov. 26, 2015.

(Continued)

*Primary Examiner* — Robert Sandy
(74) *Attorney, Agent, or Firm* — Hamilton, Brook, Smith & Reynolds, P.C.

(57) ABSTRACT

According to the invention there is a clip (10) comprising: a pair of opposed gripping portions (18, 20) each having a gripping surface (22, 24), each gripping portion being located on a clip half, wherein one clip half further includes a stop (40) space apart from the gripping portion which is engageable with a point spaced apart from the gripping portion on the other clip half.

18 Claims, 9 Drawing Sheets

(51) Int. Cl.
*F16B 2/10* (2006.01)
*F16M 13/02* (2006.01)

(56) References Cited

FOREIGN PATENT DOCUMENTS

GB 2448068 A 10/2008
WO WO 2016/038354 A1 3/2016

OTHER PUBLICATIONS

UK Search Report for Application No. GB1415835.6, dated Nov. 13, 2014.

* cited by examiner

CLIP

This application is the U.S. National Stage of International Application No. PCT/GB2015/052593, filed Sep. 8, 2015, which designates the U.S., published in English, and claims priority under 35 U.S.C. §§ 119 or 365(c) to GB Application No. 1415835.6, filed Sep. 8, 2014. The entire teachings of the above applications are incorporated herein by reference.

The present invention relates to a clip and a method of manufacturing a clip. The clip can be suited to a number of applications.

The term clip used herein is to be understood as encompassing an object for holding an item in position. The item can include, but is not limited to, clothing, footwear, documents and household objects.

Clips are well known in the prior art and exist in a number of embodiments such as hangers for garments, footwear, as clothes pegs or as clamps. There are a number of problems associated with known clips such as the methods of construction and assembly.

The method of assembling a known clip is to slide a clip half having lugs into a recess between a lug retaining portion and a clip body of a complementary clip half. This compromises the strength of the moulding due to the force exerted on pushing the clip half with a lug into place. In order to overcome this problem the lug retaining portion has been made thick enough to withstand the force of the clip portion having lugs being pushed against it. However, this results in a lot of material being used which increases production costs.

Some known clips have elastomeric pads on the gripping portion to reduce damage to the item they are retaining. This is particularly the case when the item to be retained is heavy and a strong gripping force is required. These clips suffer with the problem of the pads becoming stuck together when not in use. This may be as a result of the pads becoming warm during transport or storage but also because a spring is used to urge the pads together. In order to overcome this problem it has been known to place a thin, plastic strip between the pads. However, this is a time consuming step as the strip needs to be inserted before shipping or storage and then removed before use. It is also wasteful of materials. A solution to this problem is to have at least one protrusion on the gripping surface to hold apart the gripping surfaces. However, these protrusions can mark and/or damage the item they are retaining which is undesirable.

The present invention, in at least some of its embodiments, seeks to solve some of the problems mentioned above.

In an embodiment the invention relates to a clip comprising: a pair of opposed gripping portions each having a gripping surface, each gripping portion being located on a clip half, wherein one clip half further includes a stop spaced apart from the gripping portion which is engageable with a point spaced apart from the gripping portion on the other clip half.

The terms half and halves used herein are intended to mean two parts which form a clip and is not intended to mean that they are equal in size or are mirror images. In an embodiment, the clip halves are biased by a biasing means to urge the stop against a point on the other clip half so as to prevent the gripping surfaces from being urged together by a force exerted by the biasing means. The stop is engageable with the point on the other clip half by virtue of simply abutting the point or the clip half having an indentation for receiving the stop.

The provision of a stop prevents the gripping surfaces from being urged together as the stop on one clip half and the point on the other clip half are urged together instead. This prevents, or lessens, the chance of the gripping surfaces becoming stuck together by virtue of the force exerted by the biasing means. The stop can be dimensioned so that it allows at least a part of the opposing gripping surfaces to touch each other. Alternatively, the stop can be dimensioned to ensure that the opposing gripping surfaces do not touch each other. The dimension of the stop depends upon the desired use of the clip and the item to be retained. For example, the inventors have found it is desirable to have the gripping surfaces to be held apart by a small distance when the item to be retained is a pair of boots, for example. Alternatively, if the item to be retained is thin then it will be favourable for the gripping portions to be touching in a non-use configuration so that the thin item is retained and the stop will be of a smaller dimension than the stop on a clip used to retain a large item. If a large item is to be retained then a larger spacing apart of the gripping surfaces is acceptable so that the force exerted by the gripping surfaces does not cause damage to the item to be retained. This is achieved by having a stop of a larger dimension than a stop on a clip used to retain a thin item.

The point may be any suitable feature for engaging with the stop, such as a surface, a raised feature or a receptacle.

In an embodiment, the two clip halves are biased by a biasing means in the form of a spring. In a further embodiment, the spring is an anti-twist spring which ensures the gripping force exerted by the gripping portions on the item to be retained is distributed evenly.

In an embodiment, the clip halves are in pivotal connection with each other. A pivoting force may be applied to at least one of the halves so that at least one of the halves pivots thereby moving the gripping portions away from each other so that an item to be retained can be placed between the gripping portions. The pivoting force applied needs to be greater than the force exerted by the biasing component. A user can grip both the clip halves and apply a force thereto causing at least one of the halves to pivot about the pivotal connection thereby distancing the gripping portions from one another so that an item to be retained can be placed between the gripping portions.

In an embodiment, the pivotal connection can be effected by any suitable means. In an embodiment, one of the clip halves has at least one lug which is engageable with at least one lug retainer on the other clip half. In an embodiment, the lug retainer is a closed loop so an outer part of the lug retainer defines a recess into which the lug is engageable. The at least one lug engages with the at least one lug retainer and is maintained in place by an interference fit. In an embodiment, one clip half has two lugs and the other clip half has two lug retainers. In an embodiment, the lugs are tapered so that as the clip is assembled according to the method described below they progressively force the lug retainers apart to then allow the lugs to engage the lug retainers. Alternatively, a clip half may be formed with one lug and one lug retainer which are engageable with a complementary lug and lug retainer on the other clip half. The interference fit is strong enough to maintain the two clip halves in pivotal connection even without the biasing component being in place.

In an embodiment at least one of the clip halves has a pushable surface on which a user can exert a force to cause at least one clip half to pivot about the pivotal connection.

The pushable surface may be inclined with respect to the rest of the clip half to enable it to be pushed more easily by a user.

In an embodiment the pushable surface defines a kimble hole through which a fastener is passed, the fastener is attachable to the item(s) to be retained by the clip. This attachment to the clip and the item(s) to be retained prevents the item becoming completely detached from the clip should the gripping force be removed for any reason. The fastener can be of any suitable material such as a plastic or metal tag.

In an embodiment, the gripping surfaces may be formed of an elastomeric material. In another embodiment, the gripping surfaces are formed, at least in part, by thermoplastic elastomer (TPE). TPE is a tacky material and further assists in retaining the item between the gripping surfaces. Due to its tackiness, side to side movement of the item to be retained is limited. In another embodiment, the gripping surfaces are formed, at least in part, by acrylonitrile butadiene styrene (ABS). ABS is a flexible material and is stronger and lighter than TPE. In another embodiment, the gripping surfaces may be smooth or have teeth or serrations which may be opposed or staggered with respect to the teeth or serrations on the opposite clip half.

In an embodiment, one of the clip halves has a suspension means connected thereto. The suspension means allows the clip to be suspended from a rack, or the like, thereby displaying the item retained by the clip.

In another embodiment, one of the clip halves has a portion on which information can be displayed such as by a label affixed thereto. In an embodiment, this information portion is located near to the pivotal connection so it can also act as a pushable surface upon which a force can be applied. In an embodiment, the pushable surface on one clip half is opposing the information portion so that the pushable surface and label portions can be pushed towards each other so as to cause a pivoting motion to move the gripping portions away from each other when a force greater than that exerted by the biasing component is applied.

In another embodiment the invention relates to a method of manufacturing a clip comprising the steps of forming two complementary clip halves wherein each clip half has a gripping portion having a gripping surface, one clip half has at least one lug retainer and the other clip half has at least one lug which is engageable with the at least one lug retainer on the complementary clip half, aligning the at least one lug with the at least one lug retainer, exerting a force on at least one of the clip halves so that the at least one lug causes the at least one lug retainer to deform in an outward direction, thereby allowing passage of the lug until it engages with the lug retainer.

The clip formed by this method uses less material than known clips as the lug retainers are closed loop which defines a recess into which the lugs are retained. The lug retainers are robust enough to withstand the force required to connect the other clip half having lugs.

In an embodiment, the method of manufacturing may be automated. The method can further comprise an additional step of inserting a biasing component between the two clip halves. In an embodiment the biasing component is a spring. In another embodiment, the biasing means is an anti-twist spring.

The method of forming a clip half may include forming a first clip half having a stop which abuts a point on the second clip half when assembled. This stop is urged against the point on the second clip half by the biasing component.

In one clip half is formed with two lugs and the complementary clip half is formed with two lug retainers. In a further embodiment, one clip half is formed with a lug and a lug retainer and the other clip half is formed with a complementary lug and lug retainer. In a further embodiment, the lugs are tapered to cause deformation of the lug retainer during assembly.

The invention also relates to a method of attaching an item to a clip according to an embodiment described herein comprising the steps of: providing a clip according to an embodiment of the invention; exerting a pivoting force on at least one of the clip halves to overcome the force exerted by the biasing component; positioning the gripping portions either side of an item or items to be retained by the clip; and releasing the pivoting force thereby allowing the gripping surfaces to contact the item to be retained.

The clip may be configured to be any size which is suitable for the intended purpose. For example, the clip can be the size of a clothes peg for retaining clothes or a large clamp for gripping larger objects. The clip can be manufactured from any suitable material. In an embodiment, the clip is manufactured from plastic, preferably recycled plastic, and the spring is made of metal.

Whilst the invention has been described above, it extends to any inventive combination as set out above or in the following description, drawings or claims.

Embodiments of clips in accordance with at least one embodiment will be described, by way of example only, with reference to the accompanying drawings in which.

Figure 1:
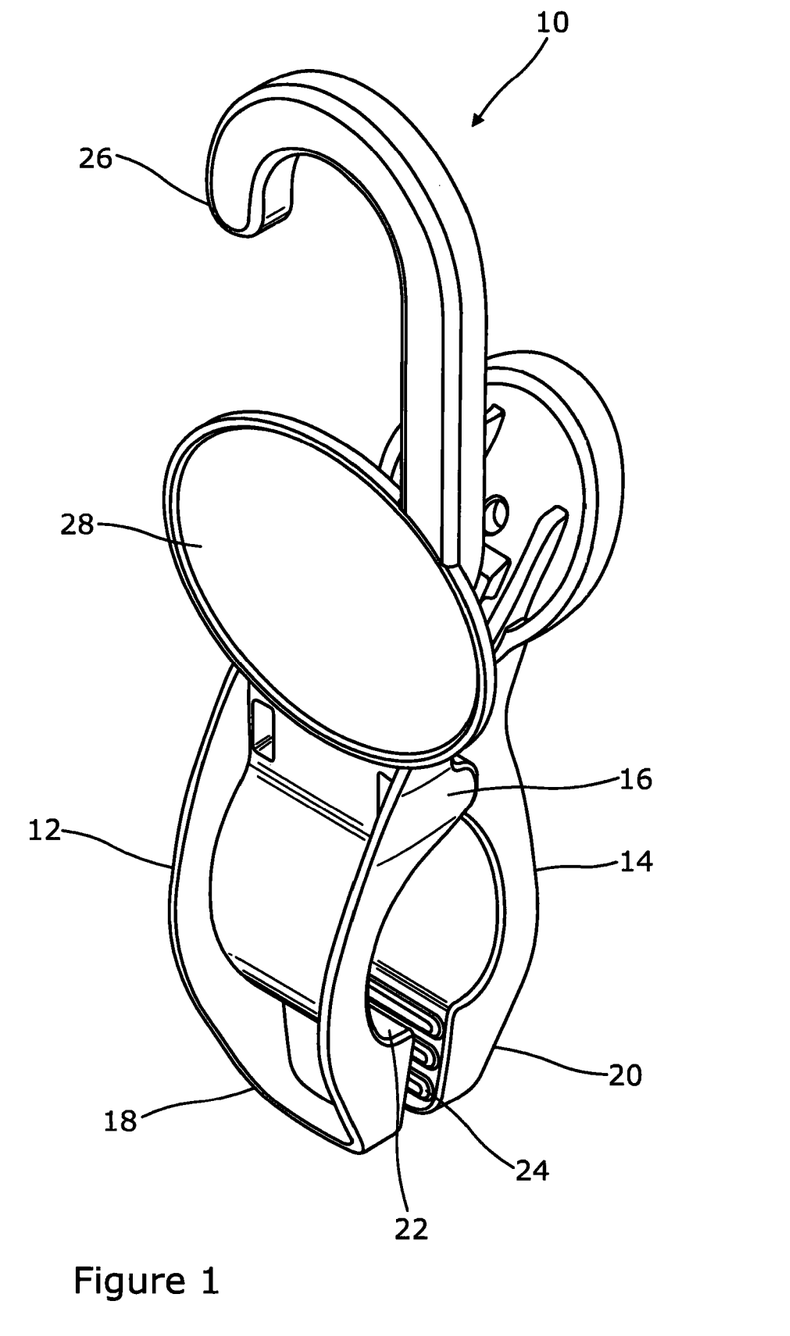
FIG. 1 shows an assembled clip made according to the method disclosed herein.

FIG. 1 shows a clip 10 in a closed, non-use configuration which has been manufactured according to a method of manufacture described herein. The clip 10 includes two clip halves 12, 14 pivotally connected to each other about a pivot point 16. The two clip halves have gripping portions 18, 20, each having a gripping surface 22, 24 which retains an item. In the embodiment shown in FIG. 1, the gripping surfaces are teeth. The two halves are biased to ensure the gripping surfaces are close, or even touching each other, in a non-use position, as is shown in this figure. This embodiment shows a clip for footwear which also includes a suspension means 26 and an area 28 upon which information can be displayed.

Figure 2:
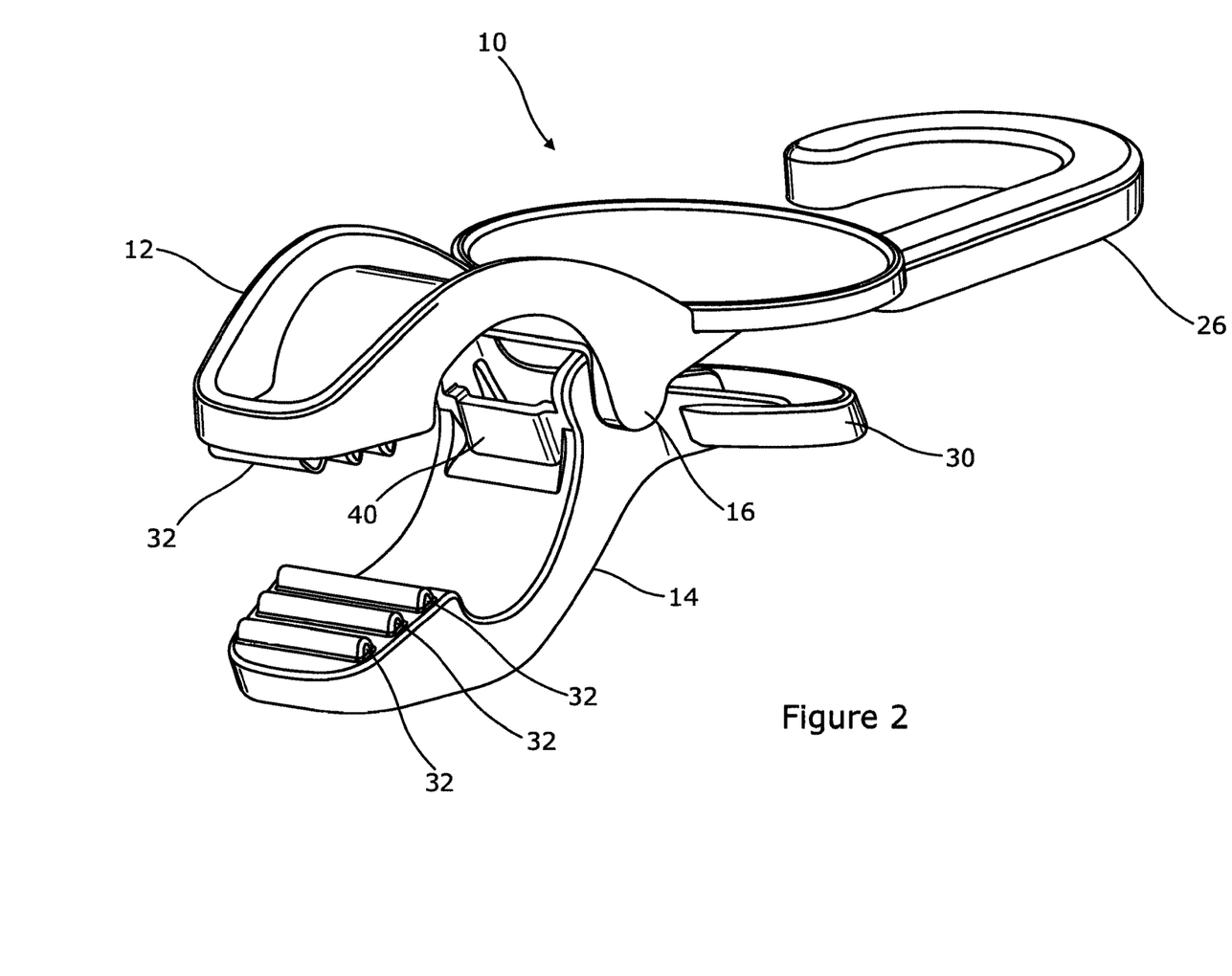
FIG. 2 shows the clip of FIG. 1 in an opened configuration.

FIG. 2 shows the clip of FIG. 1 in an opened configuration. At least one of the clip halves 12, 14 has been pivoted about pivot point 16 in order to move the gripping surfaces 22, 24 away from one another. The pivoting motion can be effected by applying pressure to the pushable surface 30, the information area 28 or both of these. An item to be displayed, such as a pair of boots, can be placed between the gripping surfaces 22, 24. The gripping surface is provided by teeth 32. The pressure is released from the pushable surface and/or information area 28 and the clip returns to its closed configuration, as shown in FIG. 1 by virtue of a biasing component, not shown, which allows the clip to grip the item to be displayed.

Figure 3:
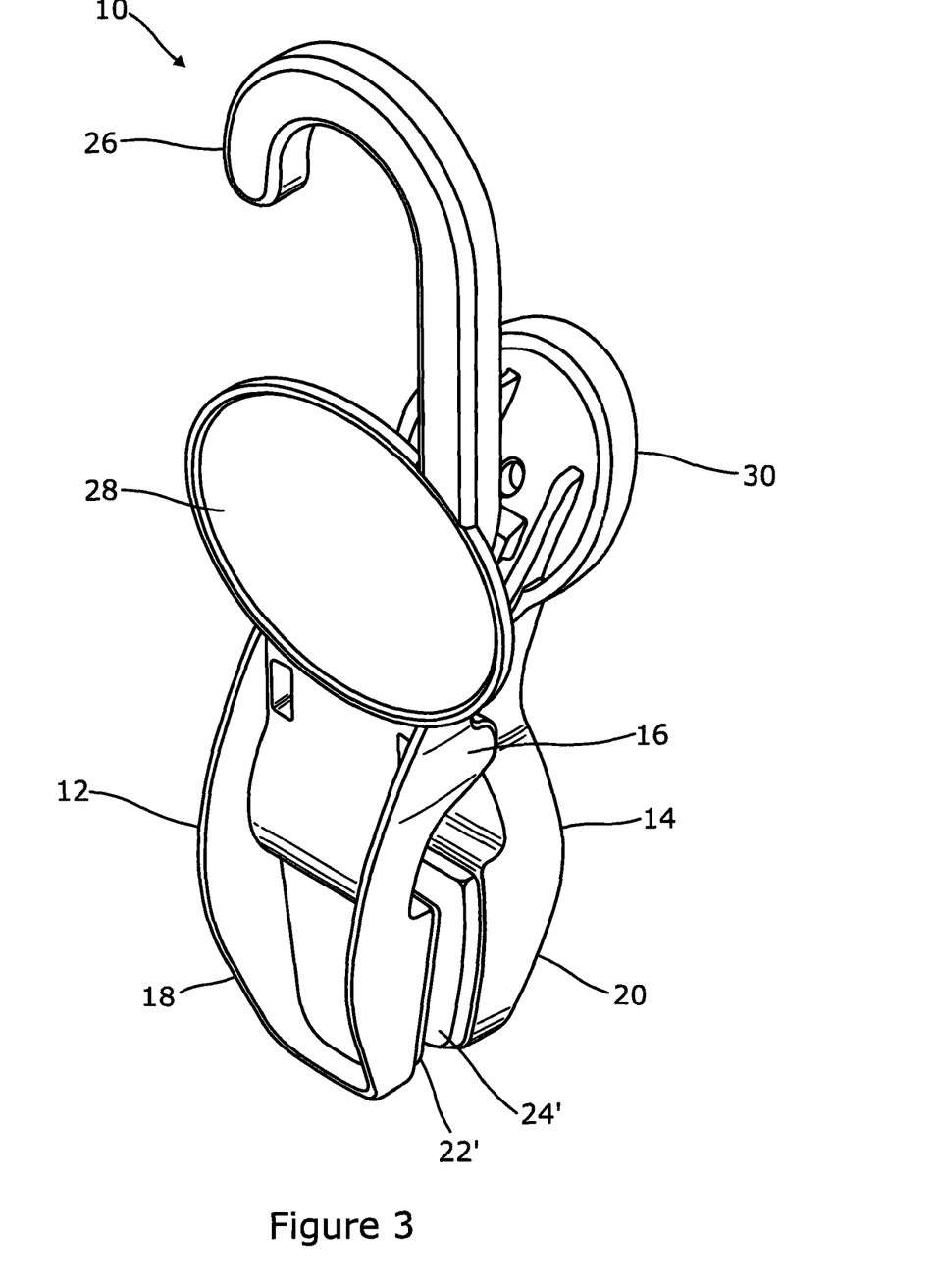
FIG. 3 shows a clip according to another embodiment of the invention.

FIG. 3 shows a clip 10 according to an embodiment of the invention which has many features in common with the clip shown in FIG. 1. The clip is operated in the same way as that shown in FIGS. 1 and 2 and can be manufactured by the method described herein. It is also suited to displaying footwear. In this embodiment, the gripping surfaces 22, 24 are made of an elastomeric material.

Figure 4:
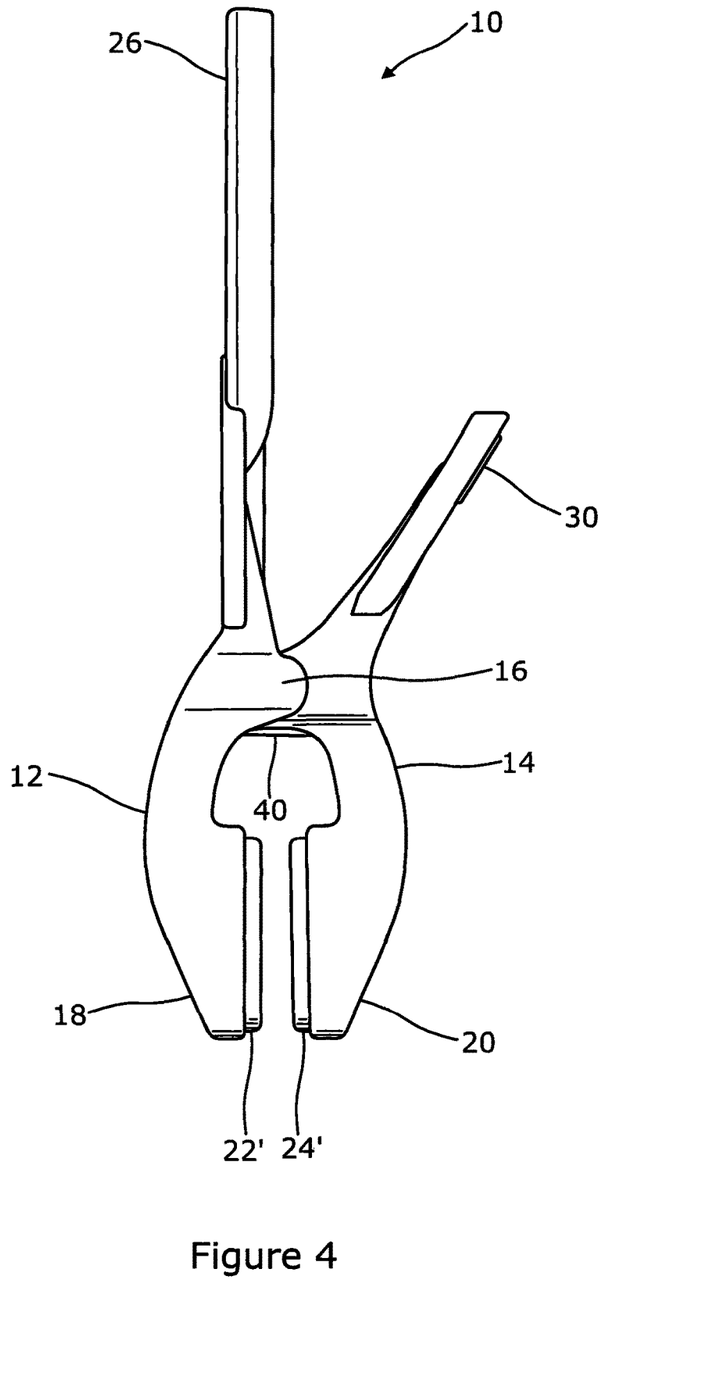
FIG. 4 is a side on view of the clip of FIG. 3.

FIG. 4 is a side on view of the clip 10 of FIG. 3. It can be seen that the gripping surfaces 22, 24 are not touching as they are held apart by a stop 40, which is located on clip half 14 and spaced apart from the gripping surface 24, which abuts the other clip half 12 at a point 41 spaced apart from the gripping surface 22. The stop 40 is urged towards the other clip half by a biasing component, which is not shown. As the biasing component exerts a force on the stop 40 and abutting portion of the other clip half, there is little or no force exerted on the gripping surfaces 22, 24 thereby overcoming the problem of the gripping surfaces sticking together when not in use or damaging the item(s) to be retained when in use. Optionally, one or more of the gripping surfaces 22, 24 may be provided with a protruding feature such as a rib which can act as a failsafe stop in the event that the stop 40/point 41 mechanism fails to hold the gripping surfaces 22, 24 apart.

Figure 5:
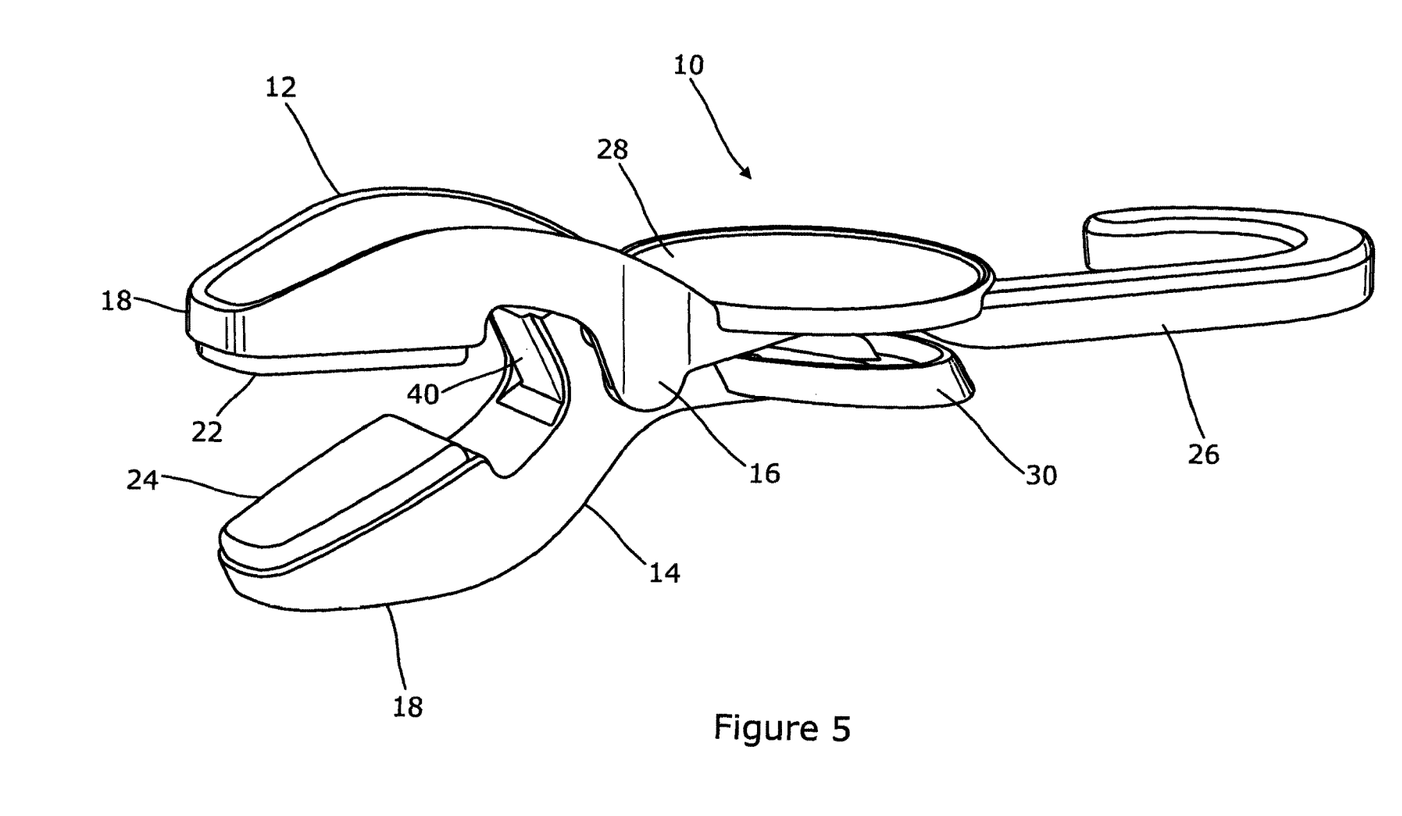
FIG. 5 is a perspective view of the clip shown in FIGS. 3 and 4.

FIG. 5 is a perspective view of the clip 10 shown in FIGS. 3 and 4 wherein the feature of the stop 40 on clip half 14 is more clearly visible. The stop 40 abuts a point 41 on the other clip half 12 by virtue of the force exerted by the biasing component. This ensures that the gripping surfaces 22, 24 are not urged toward one another by a biasing force. In this figure it can be seen that the pushable surface 30 has been urged towards the area for information 28 so that the gripping surfaces 22, 24 have been moved away from one another about pivot point 16. An item can be placed between the gripping surfaces 22, 24 and the force being applied to the pushable surface 30 and/or the area for information 28 can be released. The biasing force returns the clip to its closed position as shown in FIG. 3 and the item is gripped.

Figure 6:
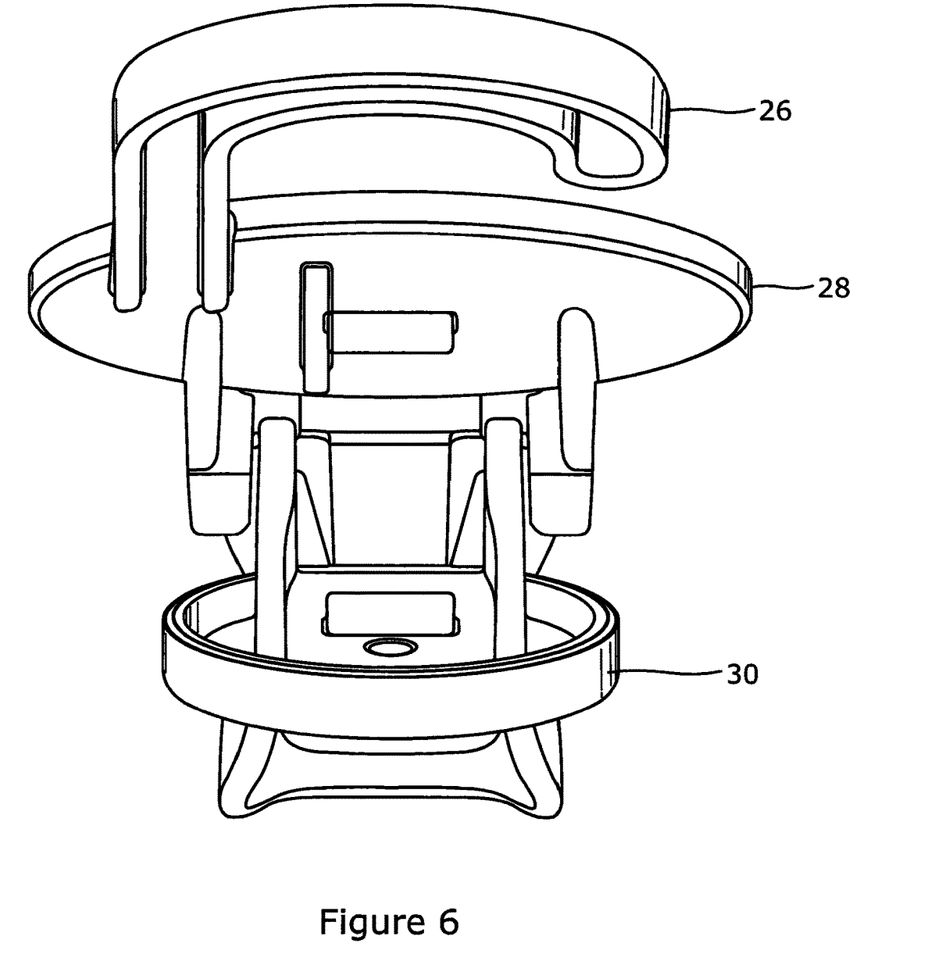
FIG. 6 shows an end on view of the clip shown in FIG. 1 or 3.

FIG. 6 shows an end on view of the clip according to the embodiments shown in FIG. 1 or 3. The clip halves 12, 14 are biased by an anti-twist spring 34 to maintain the clip in the closed configuration shown in FIGS. 1, 3 and 4. In order to move the clip from the position shown in FIGS. 1, 3 and 4 to that shown in FIGS. 2 and 5, a force must be applied to the pushable surface 30 and/or information area 28 which is greater than the force exerted by the spring 34.

Figure 7:
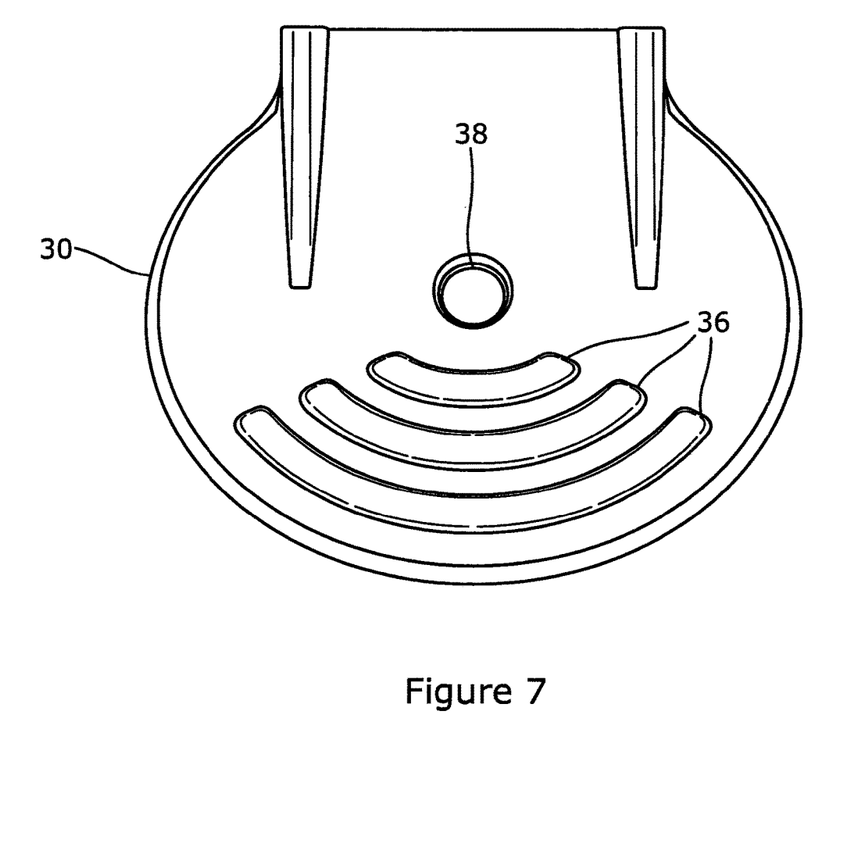
FIG. 7 is a close up of the pushable surface on a clip according to one embodiment.

FIG. 7 is a close up of the pushable surface 30 to which pressure can be applied to pivot the clip halves about pivot point 16. To ensure a good grip on the pushable surface is achieved, ridges 36 can also be provided. The pushable surface 30 defines a kimble hole 38 through which a fixing means can be passed. The fixing means is also attachable to the item to be retained by the clip 10 thereby ensuring the item to be retained is connected to the clip by an additional means.

Figure 8:
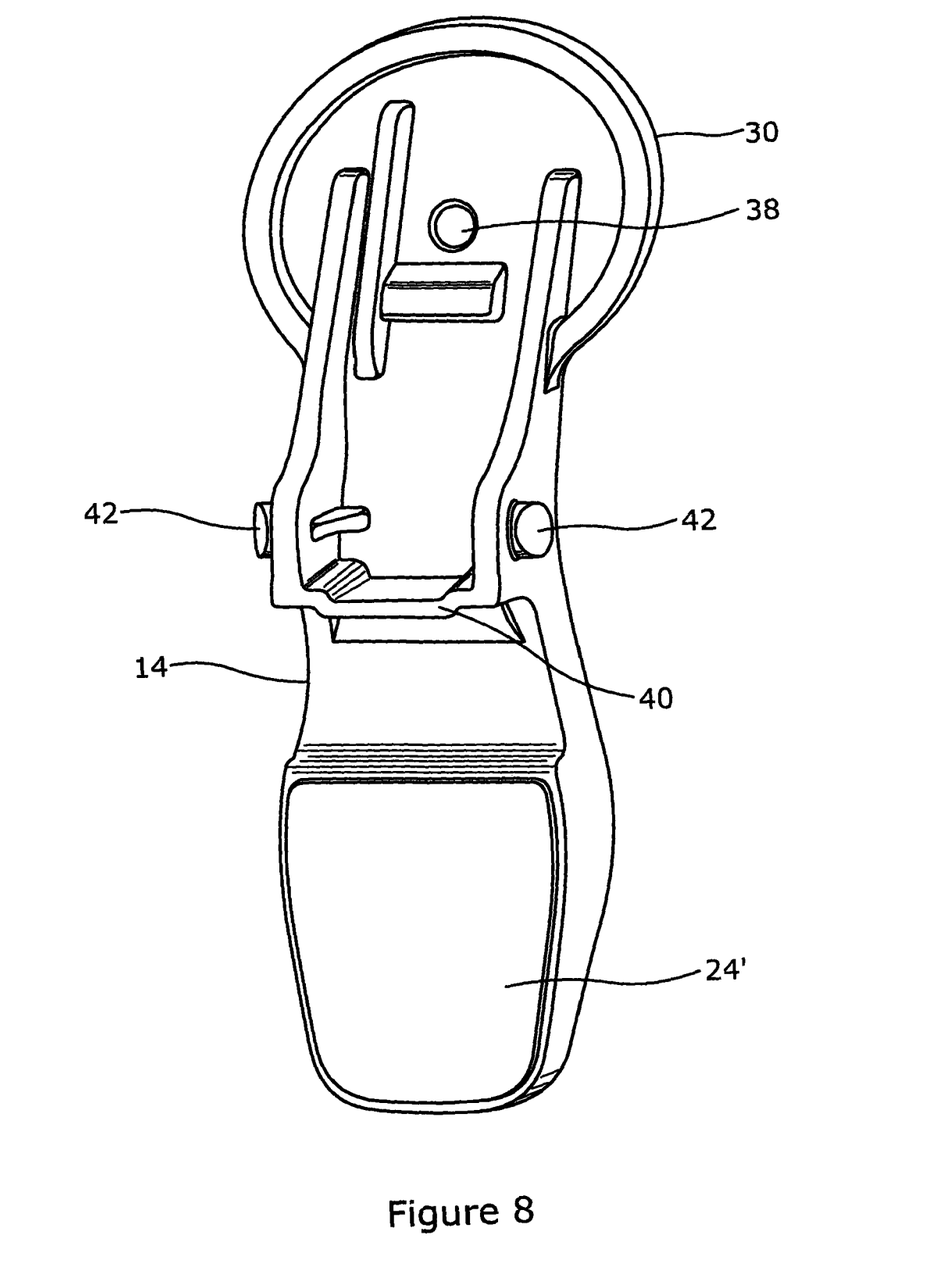
FIG. 8 is a front view of a clip half according to an embodiment of the invention.
Figure 9:
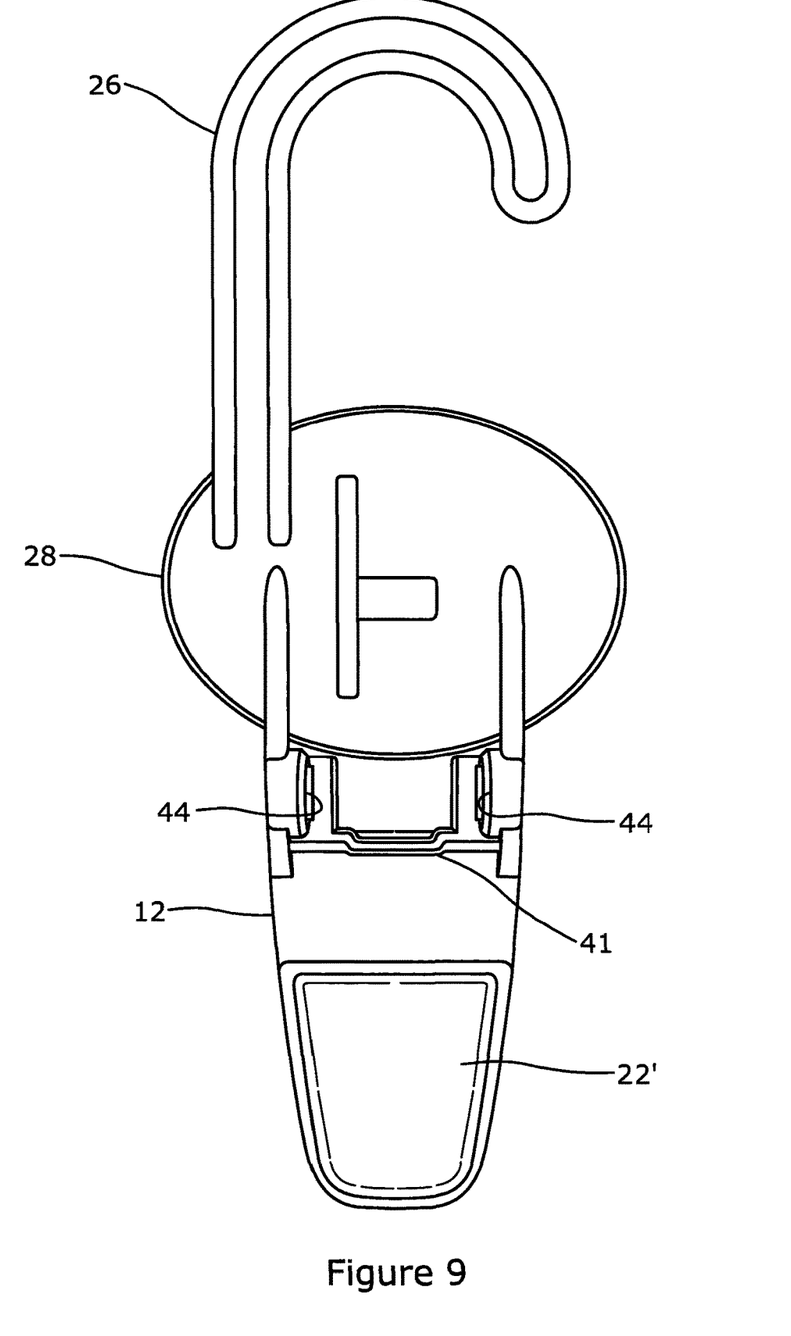
FIG. 9 is a front view of a clip half which is complementary to the clip half of FIG. 8.

FIG. 8 shows one of the clip halves 14. The clip half 14 has lugs 42 which are tapered so that when this clip half is pressed against the complementary clip half shown in FIG. 9 the lugs progressively deform the lug retainers 44 until the lug enters the recess defined by the lug retainer 44. The lug retainer 44 is a closed loop. The lugs 42 and lug retainers 44 effect a pivotal connection of the two clip halves, and therefore the clip 10, at pivot point 16. In an embodiment, a biasing means 34 is inserted between the two clip halves 12, 14 before they are pressed together to form the clip 10.

The present invention overcomes the problems of the prior art by providing an alternative means of manufacturing and assembling a clip and an improved clip. The features disclosed in the foregoing description, or the following claims, or the accompanying drawings may, separately, or in any combination of such features, be utilised for realising the invention in diverse forms thereof.

The invention claimed is:

1. A clip comprising: a pair of opposed gripping portions each having a gripping surface, each gripping portion being located on a clip half, wherein one clip half further includes a stop spaced apart from the gripping portion, the stop being engageable with a point spaced apart from the gripping portion on the other clip half, and each clip half is biased by a biasing component to urge the stop against a point on the other clip half so as to prevent the gripping surfaces from being urged together by the force exerted by the biasing component.

2. A clip according to claim 1 wherein the biasing component is a spring.

3. A clip according to claim 2 wherein the spring is an anti-twist spring.

4. A clip according to claim 1 wherein the clip halves are in pivotal connection with each other.

5. A clip according to claim 4 wherein the pivotal connection is effected by at least one lug on one clip half being engageable with at least one lug retainer on the other clip half.

6. A clip according to claim 5 wherein the at least one lug is tapered.

7. A clip according to claim 5 wherein the at least one lug retainer is a closed loop defining a recess into which the lug is placed thereby providing a pivotal connection.

8. A clip according to claim 1 wherein the clip further comprises a pushable surface.

9. A clip according to claim 8 wherein the pushable surface has at least one ridge to improve grip.

10. A clip according to claim 8 wherein the pushable surface further defines a kimble hole.

11. A clip according to claim 1 wherein the gripping surface comprises at least one tooth or serration.

12. A clip according to claim 1 wherein the gripping surface is made of an elastomeric material.

13. A clip according to claim 12 wherein the elastomeric material is thermoplastic elastomer.

14. A clip according to claim 12 wherein the elastomeric material is acrylonitrile butadiene styrene.

15. A clip according to claim 1 further comprising a suspension means.

16. A clip according to claim 1 further comprising a portion to which information is attachable.

17. A clip according to claim 1, wherein the clip further comprises a pushable surface and a portion to which information is attachable, wherein the pushable surface opposes the portion to which information is attachable.

18. A method of attaching an item to the clip according to claim 1 comprising the steps of: providing a clip according to an embodiment of the invention; exerting a pivoting force on at least one of the clip halves to overcome the force exerted by the biasing component; positioning the gripping portion either side of an item to be retained by the clip; and releasing the pivoting force.

* * * * *